United States Patent [19]

Aoki

[11] Patent Number: 5,842,049
[45] Date of Patent: *Nov. 24, 1998

[54] ELECTRONIC STILL VIDEO CAMERA HAVING ELECTRO-DEVELOPING RECORDING MEDIUM, AND IMAGE READER INCORPORATED THEREIN TO ELECTRONICALLY READ IMAGE SIGNALS FROM DEVELOPED IMAGE OF SUCH MEDIUM

[75] Inventor: Harumi Aoki, Tokyo, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 592,487

[22] Filed: Jan. 26, 1996

[30] Foreign Application Priority Data

Jan. 26, 1995 [JP] Japan .................................. 7-030128

[51] Int. Cl.⁶ .................................................. G03B 17/50
[52] U.S. Cl. ............................................... 396/30; 348/96
[58] Field of Search ........................... 348/64, 220, 231, 348/96, 98, 106, 110; 359/209, 506; 399/137, 151, 211, 221; 396/429, 30

[56] References Cited

U.S. PATENT DOCUMENTS

| | | | |
|---|---|---|---|
| 3,642,366 | 2/1972 | Kawakubo | 355/8 |
| 4,421,403 | 12/1983 | Sato et al. | 355/8 |
| 4,714,962 | 12/1987 | Levine | 358/209 |
| 4,755,880 | 7/1988 | Haenel et al. | 358/213.11 |
| 4,831,450 | 5/1989 | Sato et al. | 358/209 |
| 4,893,196 | 1/1990 | Koshiyouji et al. | 358/474 |
| 4,984,012 | 1/1991 | Sawada et al. | 355/27 |
| 5,161,233 | 11/1992 | Matsuo et al. | 355/218 |
| 5,293,242 | 3/1994 | Mamiya | 348/362 |
| 5,315,410 | 5/1994 | Takanshi et al. | 358/471 |
| 5,337,164 | 8/1994 | Yabe et al. | 358/437 |
| 5,389,966 | 2/1995 | Ikari et al. | 348/98 |
| 5,424,156 | 6/1995 | Aoki | 430/59 |
| 5,516,607 | 5/1996 | Iijima et al. | 430/20 |

FOREIGN PATENT DOCUMENTS

| | | |
|---|---|---|
| 327236 | 9/1989 | European Pat. Off. . |
| 229081 | 1/1990 | Japan . |
| 3296014 | 12/1991 | Japan . |
| 52280 | 1/1993 | Japan . |
| 524706 | 4/1993 | Japan . |
| 5150251 | 6/1993 | Japan . |
| 6313894 | 11/1994 | Japan . |

Primary Examiner—Eddie C. Lee
Assistant Examiner—John Chizmar
Attorney, Agent, or Firm—Greenblum & Bernstein, P.L.C.

[57] ABSTRACT

An electronic still video camera having an electro-developing recording medium includes a photographing optical system for forming an optical image on an image-forming plane of the recording medium to record and develop the optical image therein. An image reader is provided for optically reading the image-forming plane to obtain image data from the recorded image of the recording medium. The image reader includes: a light source having a light emitting surface arranged parallel with the image-forming plane of the recording medium such that light beams emitted from the light emitting surface of the light source are perpendicularly directed to and passed through the image-forming plane of the recording medium; an image sensor having a light receiving surface oriented in the same direction as the light emitting surface of the light source; and an optical system constituted such that the light beams passed through the image-forming plane of the recording medium are directed to and focused at the light receiving surface of the image sensor.

23 Claims, 8 Drawing Sheets

ELECTRONIC STILL VIDEO CAMERA HAVING ELECTRO-DEVELOPING RECORDING MEDIUM, AND IMAGE READER INCORPORATED THEREIN TO ELECTRONICALLY READ IMAGE SIGNALS FROM DEVELOPED IMAGE OF SUCH MEDIUM

BACKGROUND OF THE INVENTION

1. Field of the Invention

The present invention relates to an electronic still video camera having an electro-developing recording medium in which an optical image obtained through a photographing lens system is electronically and directly recorded and developed as a visible image in very little time. The present invention also relates to an arrangement of an image reader incorporated in such an electronic still video camera to electronically read image signals from a developed image of the electro-developing recording medium.

2. Description of the Related Art

Conventionally, silver halide photographic material is generally used as a material for recording an optical image. Silver halide photographic material has high optical sensitivity and high resolution, and the economical efficiency thereof is excellent. However, silver halide photographic material has drawbacks in that not only is the developing process cumbersome but also a visible image cannot be obtained at the same time as photography. A dry-type developing method has been developed to simplify the developing process. However, simultaneous development in which a visible image is obtained upon photography is impossible in the dry-type developing method.

On the other hand, as non-silver-halide photographic materials, there are known electrophotographic materials, diazotype photographic materials and free-radical photographic materials and so on. In these materials, however, there is no material which has advantageous characteristics like silver halide photographic material, while being able to simultaneously develop and keep a visible image. Note that, electrophotographic materials have been used mainly in copying machines, since they can perform dry-type development and can simultaneously develop an electrostatic latent image, which is obtained by exposure, using toner.

In such electrophotographic materials, recently, a photographic material has been developed, in which an optical image can be electronically and directly recorded and developed as a visible image in no time, the image so developed being similar to one obtained in a silver halide photographic material. A recording medium formed of such a recording material, in which a visible image is electronically and directly recorded and developed, is referred to as an electro-developing recording medium hereinafter.

For example, Japanese Unexamined Patent Publication No. 5-2280 and U.S. Pat. No. 5,424,156 disclose one type of electro-developing recording medium comprising an electrostatic information recording medium and an electric charge keeping medium. The electrostatic information recording medium includes a photoconducting layer and an inorganic oxide material layer, and the electric charge keeping medium includes a liquid crystal display, both the media being combined to face each other with a small gap therebetween. In use, a voltage is applied between the electrostatic information recording medium and the electric charge keeping medium, and an optical image is formed on the electrostatic information recording medium during the application of the voltage. An electric charge distribution is produced over the electrostatic information recording medium in accordance with a light intensity distribution of the optical image formed thereon, so that the intensity of an electric field acts on the liquid crystal of the electric charge keeping medium in accordance with the electric charge distribution. Thus, an image derived from the optical image is reproduced in the electric charge keeping medium as a visible image. Namely, as soon as the optical image is formed on the electrostatic information recording medium, the image is developed in the electric charge keeping medium.

When the electric charge keeping medium is a memory type liquid crystal display, the developed visible image can be kept therein even if the electric field is eliminated from the electro-developing recording medium. In the memory type liquid crystal display, the developed image can be erased by heating it to a given temperature. In this case, the same electro-developing recording medium can be repeatedly used for photographing.

In an electronic still video camera having the electro-developing recording medium, there may be provided an image reader comprising a solid image line sensor such as a CCD line sensor for electronically reading image signals from a developed image of the electro-developing recording medium, and the read image signals obtained from the CCD image sensor may be processed in various manners. For example, the read image signals may be stored in a second recording medium such as an IC memory card, a floppy disk, a hard disk or the like. Also, the read image signals may be transferred from the camera to an external processing device such as a computer, a TV monitor and so on.

The provision of the image reader results in the camera being bulky, because the image reader further comprises a light source for illuminating the developed image of the electro-developing recording medium, and an optical system for focusing the illuminated image at a light receiving surface of the CCD line sensor, and also because the image reader must be moved such that the developed image of the electro-developing recording medium can be scanned with the light source associated with the CCD line sensor. Accordingly, it is desirable that the image reader should be compactly arranged for reduction of the bulk of the camera.

SUMMARY OF THE INVENTION

Therefore, an object of the present invention is to provide an electronic still video camera having an electro-developing recording medium, and constituted such that an image reader for electronically reading out an image recorded and developed on the electro-developing recording medium is compactly arranged so that a size of the camera becomes as small as possible.

Another object of the present invention is to provide a compactly arranged image reader used in such an electronic still video camera.

In accordance with a first aspect of the present invention, there is provided an electronic still video camera having an electro-developing recording medium, comprising: photographing means for forming an optical image on an image-forming plane of the electro-developing recording medium to record and develop the optical image therein; and image-sensing means for optically sensing to obtain image data from the recorded image of the electro-developing recording medium, wherein the image-sensing means includes a light source having a light emitting surface arranged parallel with the image-forming plane of the electro-developing recording medium such that light beams emitted from the light emitting surface of the light source are perpendicularly directed to and passed through the image-forming plane of the electro-developing recording medium, an image sensor having a light receiving surface oriented in the same direction as the light emitting surface of the light source, and an optical system constituted such that the light beams passed through the image-forming plane of the electro-developing recording medium are directed to and focused at the light receiving surface of the image sensor.

In accordance with a second aspect of the present invention, there is provided an image reader used in an electronic still video camera having an electro-developing recording medium, comprising image-sensing means for optically sensing to obtain image data from a recorded image of the electro-developing recording medium, wherein the image-sensing means includes a light source having a light emitting surface arranged parallel with the image-forming plane of the electro-developing recording medium such that light beams emitted from the light emitting surface of the light source are perpendicularly directed to and passed through the image-forming plane of the electro-developing recording medium, an image sensor having a light receiving surface oriented in the same direction as the light emitting surface of the light source, and an optical system constituted such that the light beams passed through the image-forming plane of the electro-developing recording medium are directed to and focused at the light receiving surface of the image sensor.

In the image-sensing means as mentioned above, the image sensor may be arranged such that the light receiving surface thereof is included in an extension of the image-forming plane of the electro-developing recording medium. Preferably, the image sensor of the image-sensing means is constituted as a line sensor, and the light source of the image-sensing means is constituted as a linear light source. The line sensor and the linear light source are associated with each other such that they are relatively movable with respect to the electro-developing recording medium, whereby the image-forming plane thereof is scanned with the light beams emitted from the linear light source. More preferably, the line sensor and the linear light source are supported by a carriage member which is movable with respect to the electro-developing recording medium, and the optical system of the image-sensing means is immovably provided with respect to the carriage member.

The optical system may include a converging lens or image-forming lens, and a pair of reflectors associated therewith, wherein the light beams emitted from the linear light source and passing through the electro-developing recording medium are directed to one of the reflectors, and are then reflected to the image-forming lens. The light beams passing through the image-forming lens are directed to the other reflector, and are then reflected to the light receiving surface of the line sensor.

Preferably, the electro-developing recording medium comprises an electrostatic information recording medium and an electric charge keeping medium. The electrostatic information recording medium includes a photoconducting layer and an inorganic oxide material layer, and the electric charge keeping medium includes a liquid crystal display which preferably comprises a memory type liquid crystal display.

In accordance with a third aspect of the present invention, an image reader is provided for electronically reading an image recorded and developed on an image-forming plane of an electro-developing recording medium. The image reader includes light source means disposed at one side of the image-forming plane of the electro-developing recording medium for illuminating the image-forming plane of the electro-developing recording medium; image-sensing means disposed at the one side of the image-forming plane of the electro-developing recording medium for optically sensing to obtain image data from the image recorded and developed thereon; and image-forming optical system means disposed at the other side of the image-forming plane of the electro-developing recording medium and including a converging lens defining two focal planes, and two reflectors associated therewith, the converging lens and two reflectors being arranged such that the focal planes defined by the converging lens are consistent with a light emitting surface of the light source means and a light receiving surface of the image-sensing means.

In this image reader, the two reflectors may be arranged at sides of the converging lens such that light beams emitting from the light emitting surface of the light source means and passing through the image-forming plane of the electro-developing recording medium are reflected and directed to the converging lens along an optical axis thereof, and such that the light beams passing through the converging lens are reflected and directed to the light receiving surface of the image-sensing means.

BRIEF DESCRIPTION OF THE DRAWINGS

These objects and other objects of the present invention will be better understood from the following description, with reference to the accompanying drawings in which.

DESCRIPTION OF THE PREFERRED EMBODIMENTS

Figure 1:
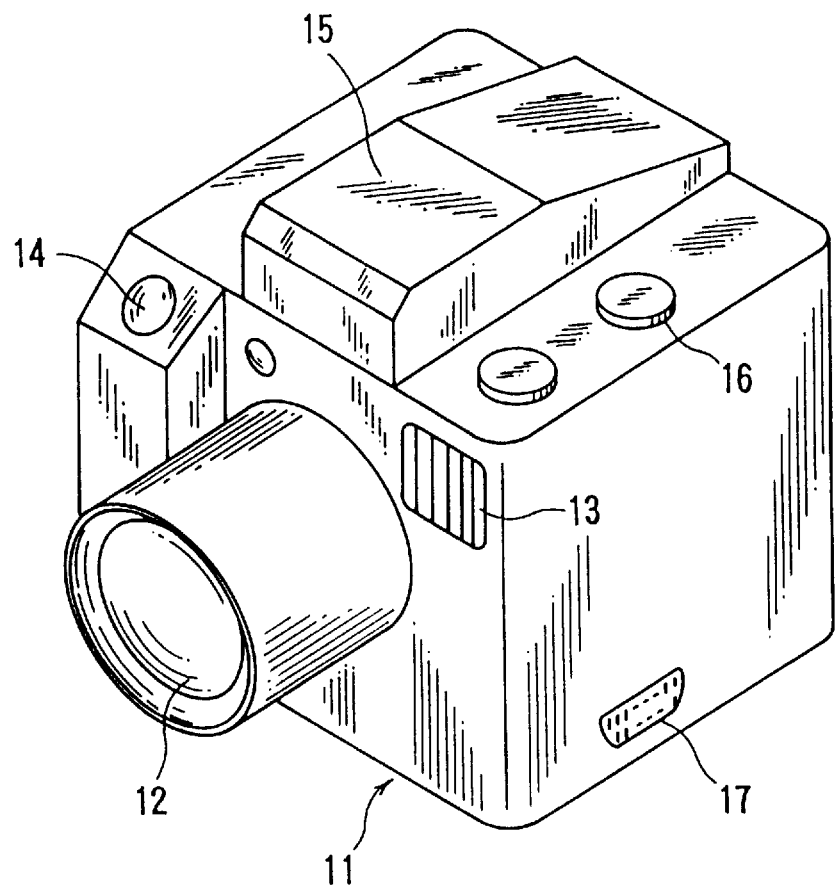
FIG. 1 is a schematic perspective view showing an appearance of an embodiment of an electronic still video camera having an electro-developing recording medium according to the present invention.

FIG. 1 is an external view of a first embodiment of an electronic still video camera having an electro-developing recording medium, according to the present invention.

When viewing a camera body 11 from a front side thereof, a photographing optical system 12 is provided on approximately a central portion of a front surface of the camera body 11, and an electronic flash 13 is disposed on the front surface of the camera body 11 at a right side of and above the photographing optical system 12. A release switch 14 is provided on the side opposite to the electronic flash 13. On an upper surface of the camera body 11, a view finder 15 is provided at the center portion thereof, and operation switches including a scan start switch 16 are provided on a side of the view finder 15. On a side surface of the camera body 11, an output terminal connector 17 is provided at a lower portion thereof so that an image signal obtained by the camera can be outputted to an external recording device.

Figure 2:
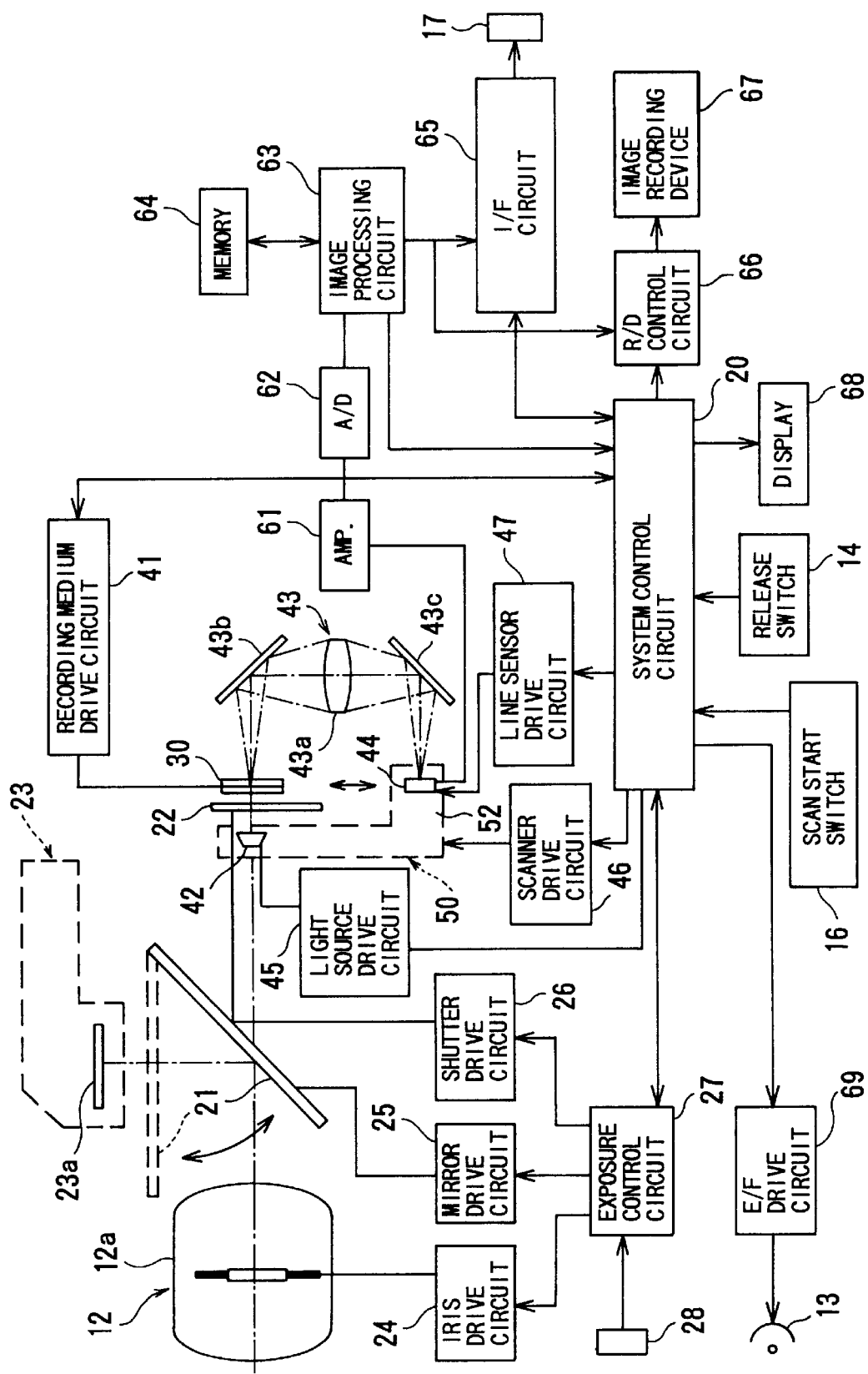
FIG. 2 is a block diagram of the electronic still video camera shown in FIG. 1.

FIG. 2 shows a block diagram of the still video camera as mentioned above, in which a system control circuit 20 including a micro-computer or micro-processor is provided to control the still video camera as a whole.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively. These drive circuits 24, 25 and 26 are controlled by an exposure control circuit 27 which is energized in accordance with a command signal outputted by the system control circuit 20.

While an exposure is controlled, an opening degree of the aperture 12a is adjusted by the iris drive circuit 24 under control of the exposure control circuit 27 based on an output signal of a photometry sensor 28.

The quick return mirror 21 is usually set to a down-position (an inclining position shown by the solid line in the drawing), and thus a light beam passing through the photographing optical system 12 is led to the view-finder optical system 23, so that an object to be photographed can be observed by a photographer. When a photographing operation is carried out, the quick return mirror 21 is rotated upward by the mirror drive circuit 25, and is then set to an up-position (a horizontal position shown by the broken line in the drawing), so that the light beam is directed to the shutter 22.

The shutter 22 is usually closed, and upon performing a photographing operation, the shutter 22 is opened over a given period of time by the shutter drive circuit 26 under control of the exposure control circuit 27, and thus light beams passing through the photographing optical system 12 and the shutter 22 are led to the electro-developing recording medium 30, resulting in forming a two-dimensional optical image thereon.

A voltage is applied to the electro-developing recording medium 30 under control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is energized in accordance with a command signal outputted by the system control circuit 20.

An image reader or scanning mechanism 50 is provided in the vicinity of the electro-developing recording medium 30, and comprises a linear light source 42 including an LED (light emitting diode) array or a plurality of light emitting diodes aligned with each other, and a collimater lens for converting the light beams, emitted therefrom, into parallel light beams. Namely, the light source 42 has a linear light emitting surface for illuminating the electro-developing recording medium 30. The scanning mechanism 50 also comprises a line sensor 44 constituted as a one-dimensional CCD sensor having, for example, 2,000 pixels, and forming a linear light receiving surface, and serving as a photoelectric-conversion device for sensing and converting an optical image into electric pixel signals.

The scanning mechanism 50 further comprises a movable carriage member 52 by which the linear light source 42 and the line image sensor 44 are supported. The carriage member 52 is perpendicularly moved with respect to an optical axis defined by the photographing optical system 12, such that the electro-developing recording medium 30 is scanned with light beams emitted from the linear light source 42. During the scanning operation, the light beams passing through the electro-developing recording medium 30 are directed to the linear light receiving surface of the line sensor 44 by an optical system 43. The optical system 43 forms a part of the scanning mechanism 50, but it is immovably provided behind the electro-developing recording medium 30 and the carriage member 52.

ON and OFF control of the light source 42 is performed by a light source drive circuit 45. Reading of the pixel signals from the line sensor 44 is controlled by a line sensor drive circuit 47. Movement of the carriage member 52 of the scanning mechanism 50 is controlled by a scanner drive circuit 46. The drive circuits 45, 46 and 47 are energized by the system control circuit 20.

The pixel signals sensed and read out of the line sensor 44 are amplified by an amplifier 61, and are then converted to digital pixel signals by an analog-digital (A/D) converter 62. The digital pixel signals are subjected to a shading correction, a gamma correction and so on by an image processing circuit 63 under control of the system control circuit 20, and are then temporarily stored in a memory 64 which includes an EEPROM having correction data for the shading correction. Note, the memory 64 may have a capacity for storing a single-line of digital pixel signals outputted from the line senor 44 or may have a capacity for storing a single-frame of digital pixel signals obtained by a completion of the scanning operation of the scanning mechanism 50.

The pixel signals outputted from the memory 64 may be optionally inputted into an interface circuit 65 through the image process circuit 63. In this case, the pixel signals are subjected to a given processing such as a format-conversion processing and so on, and are then outputted to, for example, an external monitor device (not shown) through the output terminal connector 17. Also, the pixel signals outputted from the image process circuit 63 may be recorded on, for example, a second recording medium, such as an IC memory card, a floppy disk, a detachable hard disk or the like, in an image recording device 67 therefor. In this case, the pixel signals are subjected to a given processing such as an image-compression processing and a format-conversion processing in a recording device control circuit 66. The interface circuit 65 and the recording device control circuit 66 are energized in accordance with a command signal outputted from the system control circuit 20.

The release switch 14 and the scan start switch 16 are connected to the system control circuit 20, and the photographing operation and the scanning operation as mentioned above are executed by turning the switches ON. A display device 68, which may be constituted as an LCD (liquid crystal display) panel, is provided on a rear surface of the camera body 11 at a suitable location thereof, and is connected to system control circuit 20 to display various setting conditions of the still video camera. Also, an electronic flash drive circuit 69 is connected to the system control circuit 20 to control a flashing operation of the electronic flash 13.

Figure 3:
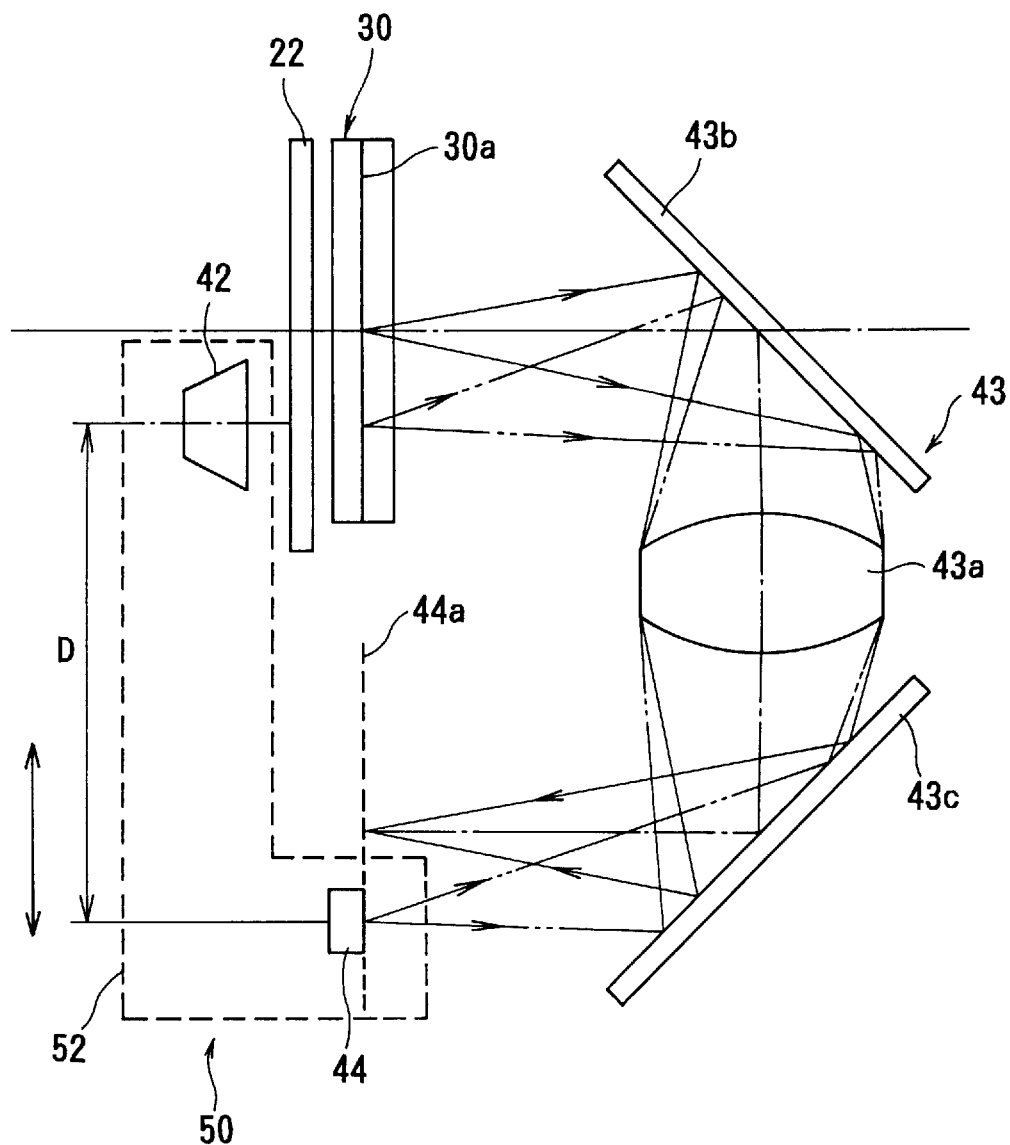
FIG. 3 is a schematic view showing an arrangement of a scanning mechanism used in the electronic still video camera shown in FIGS. 1 and 2.

FIG. 3 shows an arrangement of the optical reader or scanning mechanism 50. As mentioned above, the carriage member 52 of the scanning mechanism 50 is perpendicularly moved with respect to the optical axis defined by the photographing optical system 12, such that the electro-developing recording medium 30 is scanned with the parallel light beams emitted from the linear light source 42. The linear light source 42 and the line sensor 44 are of suitable length to completely cover and extend over one horizontal scanning line of the image formed on the electro-developing recording medium 30. The movement of the carriage member 52 is carried out by a scan drive motor (not shown) such as a stepping motor, a servo-motor or the like, which is driven by the scanner drive circuit 46 (FIG. 2). The light source 42 and the line sensor 44 supported by the carriage member 52 are separated from each other by a distance D in the direction of movement of the carriage member 52.

When the photographing operation is executed, the carriage member 52 is removed from an optical path between the photographing optical system 12 and the electro-developing recording medium 30, and is positioned at a lower position or removal position below the electro-developing recording medium 30. when the scanning operation is initiated, the carriage member 52 is moved upward from the removal position to a scanning start position. Then, the carriage member 52 is intermittently moved step by step from the scanning start position toward an upper position, whereby the electro-developing recording medium 30 is scanned by the linear light source 42.

In FIG. 3, the linear light source 42 is arranged such that the linear light emitting surface thereof is oriented to and extended parallel with an image-forming plane 30a of the electro-developing recording medium 30 on which an image is recorded and developed. Thus, the light beams emitted from the light emitting surface of the light source 42 are perpendicularly directed to and are passed through the image-forming plane 30a of the electro-developing recording medium 30. Also, the image sensor 44 is arranged such that the light receiving surface thereof is oriented in the same direction as the linear light emitting surface of the light source 42, and the optical system 43 is constituted such that the light beams emitted from the light source and passing through the electro-developing recording medium 30 are directed to and focused on the light receiving surface of the line sensor 44.

In particular, the optical system 43 includes a converging lens or image-forming lens 43a, and a pair of total reflecting mirrors or reflectors 43b and 43c associated therewith. The image-forming lens 43a is arranged such that an an optical axis thereof is perpendicular with respect to the optical axis defined by the photographing optical system 12, and the reflectors 43a and 43c are symmetrically arranged at both sides of the image-forming lens 43a with respect to the center thereof, and are inclined so as to define an angle of 45 degrees (or 135 degrees) with respect to the optical axis of the image-forming lens 43a. A distance between the centers of the reflectors 43b and 43c of the optical system 43 corresponds to the distance D between the optical axis of the linear light source 42 and the line sensor 44, and the reflectors 43b and 43c are sufficiently extended so as to cover the image-forming plane 30a of the electro-developing recording medium 30. Also, the optical system 43 has a magnification of one, and is constituted such that an image recorded and developed on the image-forming plane 30a of the electro-developing recording medium 30 is focused and formed as a life-sized aerial image on a focal plane 44a in which the light receiving surface of the image sensor 44 is included.

With the arrangement as mentioned above, during the scanning operation, a linear segment of the image developed by the electro-developing recording medium 30 is illuminated by the linear light source 42, and the light beams passing through the image-forming plane 30a of the electro-developing recording medium 30 are directed to the image-forming lens 43a due to the reflector 43b. Then, the light beams passing through the image-forming lens 43a are directed to and focused on the linear light receiving surface of the line sensor 44 due to the reflector 43c.

Figure 4:
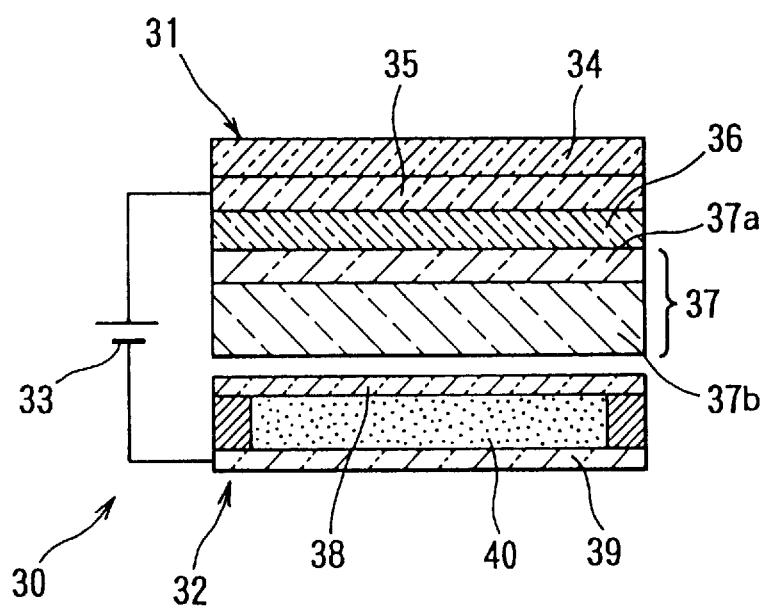
FIG. 4 is a schematic sectional view showing the electro-developing recording medium used in the electronic still video camera shown in FIGS. 1 and 2.

FIG. 4 shows a structure of the electro-developing recording medium 30, which is identical with that disclosed in Japanese Unexamined Patent Publication No. 5-2280 and U.S. Pat. No. 5,424,156, the disclosure details of which are expressly incorporated herein by reference in their entirety.

The electro-developing recording medium 30 comprises an electrostatic information recording medium 31 and an electric charge keeping medium 32, and a voltage is applied therebetween by an electric power source 33, illustrated symbolically in FIG. 4. The electric power source 33 corresponds to the recording medium drive circuit 41, and a recording medium activating signal (a voltage signal) is applied from the recording medium drive circuit 41 (i.e., the electric power source 33) to the electro-developing recording medium 30 during the photographing operation.

The electrostatic information recording medium 31 is formed by laminating a base plate 34, an electrode layer 35, an inorganic oxide material layer 36 and a photoconducting layer 37. The photoconducting layer 37 is formed by laminating an electric charge generating layer 37a and an electric charge transferring layer 37b. The electric charge keeping medium 32 is made by confining liquid crystal 40 between a liquid crystal supporting plate 38 and a liquid crystal electrode layer 39. Namely, the liquid crystal 40 is confined as a film-like layer between the supporting plate 38 and the electrode layer 39, and this film-like liquid crystal forms the image-forming plane 30a (FIG. 3). The electric charge transferring layer 37b of the photoconducting layer 37 and the liquid crystal supporting plate 38 of the electric charge keeping medium 32 face each other with a small gap therebetween. Note, as is apparent from FIG. 4, the whole structure of the electro-developing recording medium 30 is transparent.

When the electric power source 33 is turned ON, or when the recording medium drive circuit 41 is energized, a voltage signal or recording medium activating signal is applied between the electrostatic information recording medium 31 and the electric charge keeping medium 32, i.e., between the electrode layer 35 and the liquid crystal electrode layer 39. When an optical image is formed on the electrostatic information recording medium 31 by the photographing optical system 12 during the application of the voltage signal, an electric charge distribution is produced over the electrostatic information recording medium 31 in accordance with a light intensity distribution of the optical image formed thereon, so that the intensity of an electric field acts on the liquid crystal 40 of the electric charge keeping medium 32 in accordance with the electric charge distribution. Thus, an image derived from the optical image is reproduced in the liquid crystal 40 as a visible image. Namely, as soon as the optical image is formed on the electrostatic information recording medium 31, the image is developed in the electric charge keeping medium 32.

In this embodiment, since the electric charge keeping medium 32 is constituted as a memory type liquid crystal display, the developed visible image can be kept therein even if the electric field is eliminated from the electro-developing recording medium 30. In the memory type liquid crystal display, the developed image can be erased by heating it to a given temperature, using a suitable heater (not shown). In this way, the same electro-developing recording medium 30 can be repeatedly used for photographing.

Figure 5:
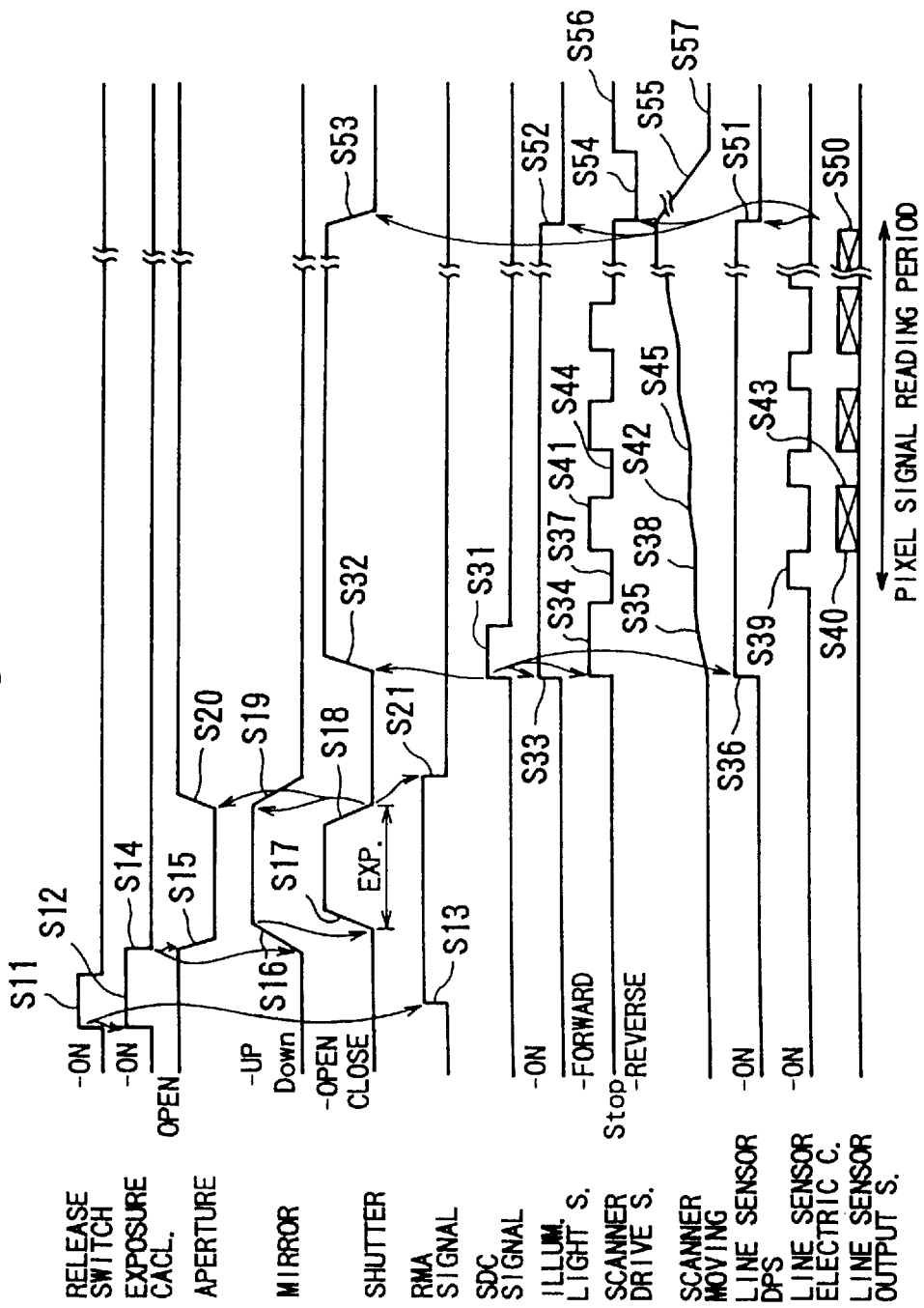
FIG. 5 is a timing chart for explaining a whole operation of the electronic still video camera shown in FIGS. 1 and 2.
Figure 6:
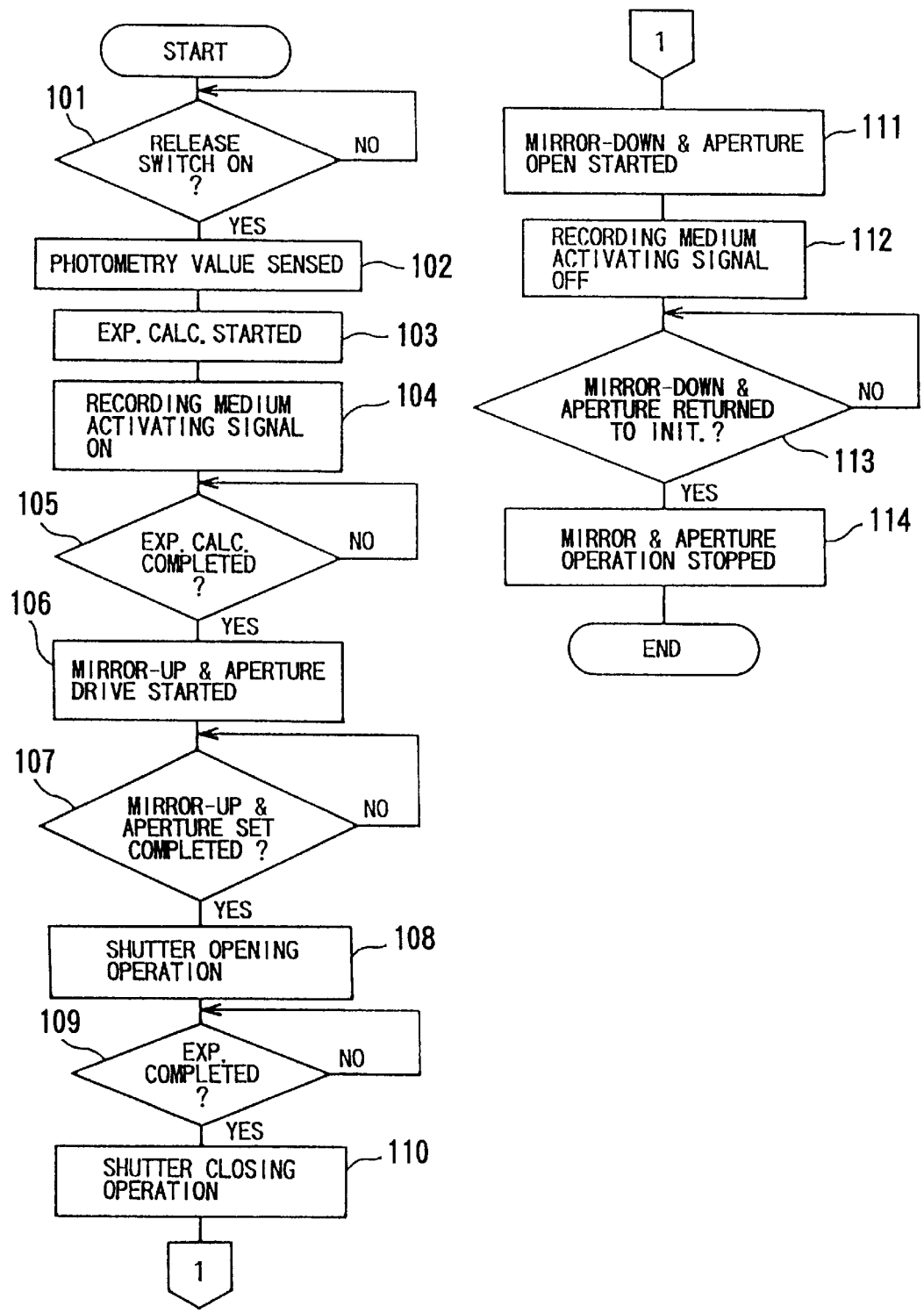
FIG. 6 is a flowchart for explaining a photographing operation of the electronic still video camera shown in FIGS. 1 and 2.

FIG. 5 shows a timing chart for explaining a whole operation of the camera, and FIG. 6 shows a flowchart for explaining a photographing operation of the camera. With reference to these drawings, the photographing operation will be explained below.

At step 101, it is determined whether or not the release switch 14 has been turned ON. If the turn-ON of the release switch 14 has been carried out, a command signal for executing the photographing operation is made ON (reference "S11" in FIG. 5), and is inputted to the system control circuit 20.

At step 102, an output signal of the photometry sensor 28, i.e., a photometry value, is sensed and fetched by the system control circuit 20, and then the control proceeds to step 103, in which an exposure calculation is started based on the fetched photometry value (reference "S12" in FIG. 5). After a predetermined period of time has elapsed from the ON operation of the release switch 14, the control proceeds to step 104, in which a recording medium activating signal outputted from the recording medium drive circuit 41 to the electro-developing recording medium 30 is made ON (reference "S13" in FIG. 5). Namely, the recording medium activating signal is changed from the low level to the high level, so that the activating voltage is applied between the electrostatic information recording medium 31 and the electric charge keeping medium 32. Then, at step 105, it is determined whether or not the exposure calculation has been completed. When the exposure calculation has been completed (reference "S14" in FIG. 5), the procedures necessary for the photographing operation are subsequently carried out in the following steps on the basis of the calculated result.

At step 106, an opening area of the aperture 12a is adjusted in accordance with the calculated result. Note, since the aperture 12a initially has a fully-open area, the adjustment of the aperture 12a is usually carried out such that the fully-open area thereof is made smaller (reference "S15" in FIG. 5). Also, at step 106, the quick return mirror 21 is changed from the down-position to the up-position (reference "S16" in FIG. 5).

At step 107, it is determined whether or not the quick return mirror 21 has been changed from the down-position to the up-position, and whether or not the adjustment of the aperture 12a has been completed. When the change of the quick return mirror 21 from the down-position to the up-position and the adjustment of the aperture 12a are completed, the control proceeds to step 108, in which the shutter 22 is opened (reference "S17" in FIG. 5), whereby an optical image is focused and formed on the electro-developing recording medium 30 in the above-mentioned manner.

At step 109, it is determined whether or not an exposure period of time, which is designated by the calculated result, has elapsed. When the exposure period of time has elapsed, i.e., when the exposure has been completed, the control proceeds to step 110, in which the shutter 22 is closed (reference "S18" in FIG. 5). After the closing of the shutter 22 is completed, the control proceeds to step 111, in which the quick return mirror 21 is returned from the up-position to the down-position (reference "S19" in FIG. 5), and in which the opening area of the aperture 12a is returned to the fully-open area (reference "S20" in FIG. 5). Then, at step 112, the output voltage of the recording medium activating signal is made OFF (reference "S211" in FIG. 5), i.e., the recording medium activating signal is returned from the high level to the low level.

Namely, the output of the recording medium activating signal to the electro-developing recording medium 30 is kept on at least during the period of time during which the shutter 22 is opened, so that recording and development of the optical image can be carried out in the electro-developing recording medium 30. As mentioned above, the electric charge keeping medium 32 of the electro-developing recording medium 30 is constituted as a memory type liquid crystal display, and thus the developed image can be held therein even if the output of the recording medium activating signal is stopped.

At step 113, it is determined whether or not the quick return mirror 21 has moved to the initial position or down-position, and whether or not the opening area of the aperture 12a has returned to the initial area or fully-open area. Then, the control proceeds to step 114, in which the driving of the quick return mirror 21 and the aperture 12a are stopped, and thus the routine represented by the flowchart of FIG. 6 is ended.

In the operation as mentioned above, the recording medium activating signal may be outputted just before the exposure is started, i.e., just before the shutter 22 is opened, if necessary. In this case, in the flow chart of FIG. 6, step 104 is positioned between steps 107 and 108.

Figure 7:
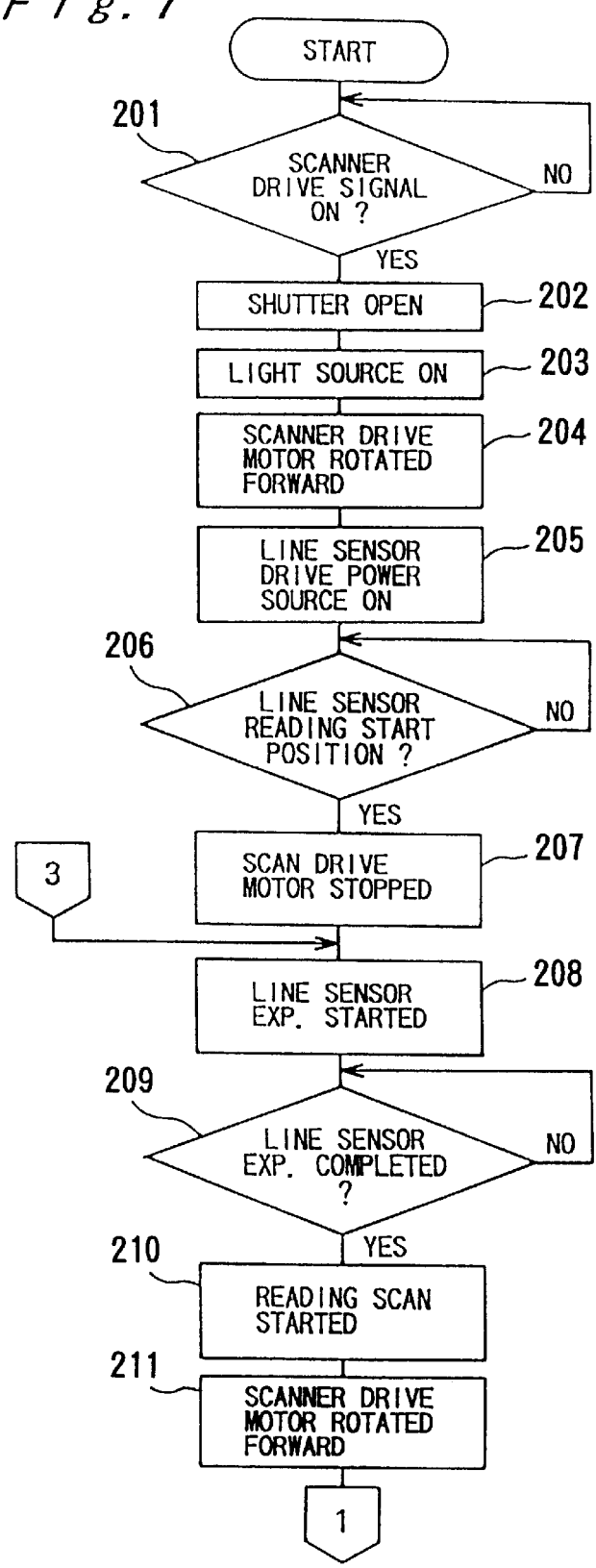
FIG. 7 is a part of a flowchart for explaining a scanning operation of the electronic still video camera shown in FIGS. 1 and 2.
Figure 8:
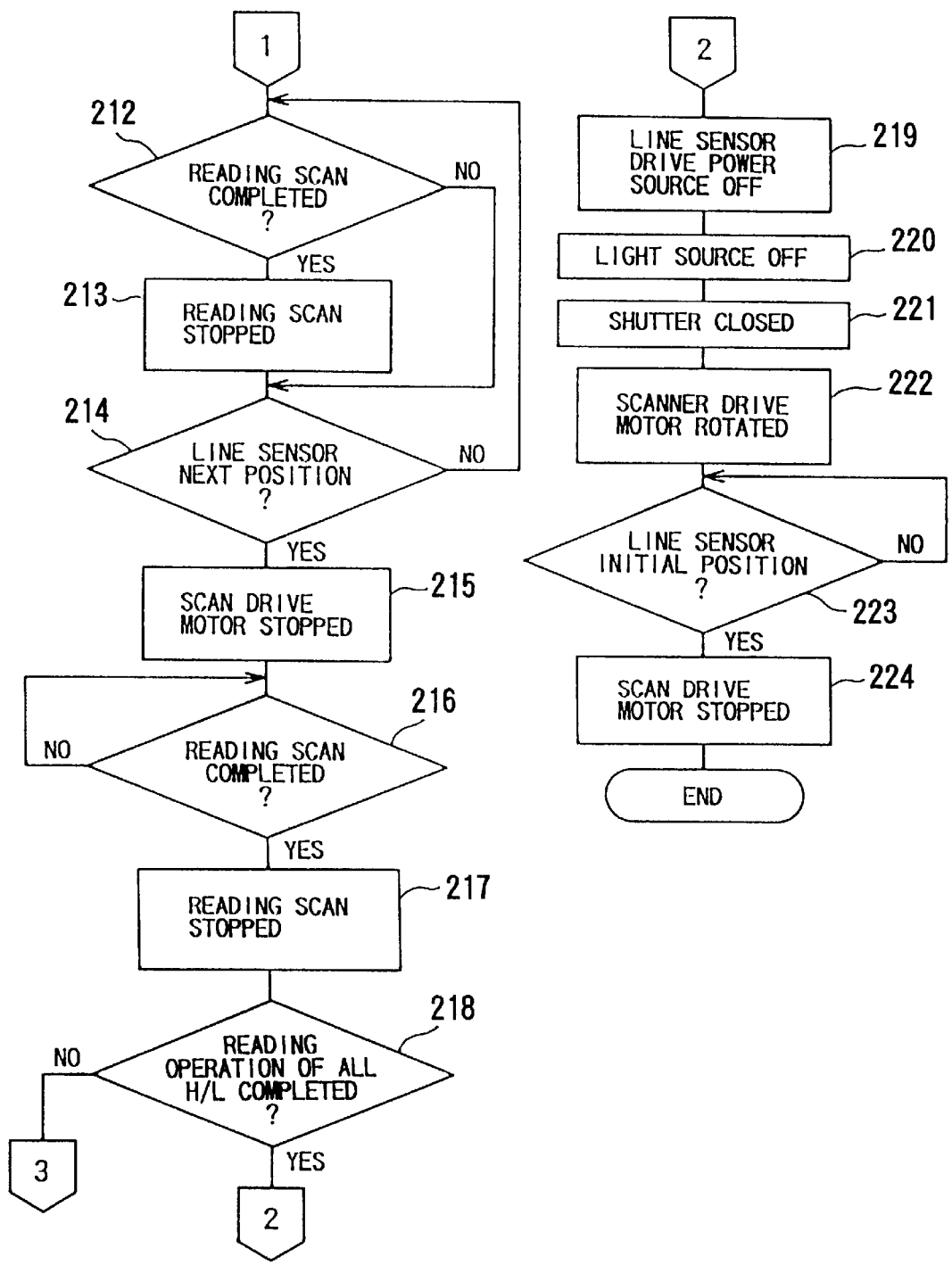
FIG. 8 is the other part of the flowchart for explaining a scanning operation of the electronic still video camera shown in FIGS. 1 and 2.

FIGS. 7 and 8 show a flowchart for explaining a scanning operation for optically sensing and reading the developed image held in the electro-developing recording medium 30. With reference to FIG. 5, and FIGS. 7 and 8, the scanning operation will now be explained below.

At step 201, it is determined whether or not the scan start switch 16 has been made ON. If the scan start switch 16 has been turned out, a scanner drive command signal for executing the scanning operation is made ON (reference "S31" in FIG. 5), and is inputted to the system control circuit.

At step 202, the shutter 22 is opened (reference "S32" in FIG. 5), and the control proceeds to step 203, in which the light source 42 is made ON (reference "S33" in FIG. 5). Then, at step 204, a scanner drive signal outputted from the system control circuit 20 to the scanner drive circuit 46 is changed from the zero level to the positive level (reference "S34" in FIG. 5), so that the scan drive motor for moving the carriage member 52 is driven in a forward direction due to the drive pulses outputted from the scanner drive circuit 46 thereto, whereby the carriage member 52 of the scanning mechanism 50 starts to move upward from the lower position or removal position, toward the scanning start position or image-reading start position (reference "S35" in FIG. 5). Subsequently, at step 205, a line sensor drive power source included in the line sensor drive circuit 47 is made ON (reference "S36" in FIG. 5).

At step 206, it is determined whether or not the carriage member 52 carrying the light source 42 and the line sensor 44 has been moved to the image-reading start position.

When the carriage member 52 reaches the image-reading start position, the control proceeds to step 207, in which the scanner drive signal outputted from the system control circuit 20 to the scanner drive circuit 46 is returned from the positive level to the zero level (reference "S37" in FIG. 5), and thus the output of the drive pulses from the scanner drive circuit 46 to the scan drive motor is interrupted to thereby stop the scan drive motor (reference "S38" in FIG. 5), whereby the carriage member 52 carrying the light source 42 and the line sensor 44 is held at the image-reading start position. Note, the standing still of the carriage member 52 at the image-reading start position may be controlled by, for example, counting the driving pulses outputted from the scanner drive circuit 46 to the scan drive motor.

At step 208, an exposure of the line sensor 44 is started by the illumination of the light source 42, and thus electric charge accumulation in the line sensor 44 is performed (reference "S39" in FIG. 5). Then, at step 209, it is determined whether or not a given time has elapsed or the electric charge accumulation in the line sensor 44 has been completed. When the electric charge accumulation in the line sensor 44 is completed, the control proceeds to step 210, in which a reading-scan of pixel signals from the line sensor 44 (i.e., a first horizontal-scanning line), is started by the line sensor drive circuit (reference "S40" in FIG. 5).

At step 211, the scanner drive signal outputted from the system control circuit 20 to the scanner drive circuit 46 is changed from the zero level to the positive level (reference "S41" in FIG. 5), so that the scan drive motor is driven in the forward direction due to the drive pulses outputted from the scanner drive circuit 46 thereto. Thus the carriage member 52, and therefore, the light source 42 and the line sensor 44, are moved upward (reference "S42" in FIG. 5).

During the movement of the carriage member 52, it is determined at step 212 whether or not the reading-scan of pixel signals from the line sensor 44 has been completed. If the completion of the reading-scan is confirmed, the control proceeds to step 213, in which the reading-scan of pixel signals from the line sensor 44 is stopped (reference "S43" in FIG. 5). Note that the completion of the reading-scan can be determined by, for example, counting reading-clock pulses outputted from the line sensor drive circuit 47 to drive the line sensor 44.

At step 212, if the completion of the reading-scan is not confirmed, the control skips over step 213, and then the control proceeds to step 214, in which it is determined whether or not the carriage member 52, carrying the light source 42 and the line sensor 44, has been moved to a next image-reading position (corresponding to a position at which the pixel signals included in a subsequent horizontal scanning line are read). If the carriage member 52 has not reached the next image-reading position, the control returns to step 212, and the routine including steps 212, 213, and 214 is repeated until the line sensor 44 reaches the next image-reading position.

At step 212, if the completion of the reading-scan is confirmed, the control proceeds to step 213, in which the reading-scan of pixel signals from the line sensor 44 is stopped. Then, the control proceeds to step 214.

At step 214, when it is confirmed that the carriage member 52 carrying the light source 42 and the line sensor 44 has reached the next image-reading position, the control proceeds from step 214 to step 215, in which the scanner drive signal outputted from the system control circuit 20 to the scanner drive circuit 46 is returned from the positive level to the zero level (reference "S44" in FIG. 5). Thus the output of the drive pulses from the scanner drive circuit 46 to the scan drive motor is interrupted to thereby stop the scan drive motor (reference "S45" in FIG. 5), whereby the carriage member 52 is held at the next image-reading position. Similarly, the standing still of the carriage member 52 at the next image-reading position can be controlled by counting the driving pulses outputted from the scanner drive circuit 46 to the scan drive motor.

Then, at step 216, it is again determined whether or not the reading-scan of the single-line of pixel signals from the line sensor 44 has been completed. This is because the control may proceed from step 214 to step 215 without having any access to step 213, i.e., because there may be a case where the reading-scan of the pixel signals from the line sensor 44 is not yet completed even after the carriage member 52 reaches the next image-reading position. When the completion of the reading-scan is confirmed at step 216, the control proceeds to step 217, in which the operation for the reading-scan is stopped.

At step 218, it is determined whether or not the whole of the developed image has been completely read, i.e., the reading-scans have been completed on all of the horizontal-scanning lines defined by intervals of the intermittent movements of the line sensor 44. This determination is made possible by, for example, counting the drive pulses outputted from the scanner drive circuit 46. If the whole of the developed image has not been completely read, the control returns to step 208. Namely, the routine including steps 208 to 218 is repeated until the reading-scans are completed on all of the horizontal-scanning lines. Note, in this first embodiment, all of the horizontal-scanning lines may be a number of about 2,000.

At step 218, when the whole of the developed image has been completely read (reference "S50" in FIG. 5), the control proceeds to step 219, in which the line sensor drive power source included in the line sensor drive circuit 47 is made OFF (reference "S51" in FIG. 5). Then, at step 220, the light source 42 is made OFF (reference "S52" in FIG. 5), and at step 221, the shutter 22 is closed (reference "S53" in FIG. 5). Subsequently, at step 222, the scanner drive signal outputted from the system control circuit 20 to the scanner drive circuit 46 is changed from the zero level to the negative level (reference "S54" in FIG. 5), so that the scan drive motor is driven in a reverse direction due to the drive pulses outputted from the scanner drive circuit 46 thereto, whereby the carriage member 52 of the scanning mechanism 50 starts to move downward toward the lower position or removal position (reference "S55" in FIG. 5).

At step 223, it is determined whether or not the carriage member 52 has been moved to the removal position. When the carriage member 52 reaches the removal position, the control proceeds to step 224, in which the scanner drive signal outputted from the system control circuit 20 to the scanner drive circuit 46 is returned from the negative level to the zero level (reference "S56" in FIG. 5). Thus the output of the drive pulses from the scanner drive circuit 46 to the scan drive motor is stopped, i.e., the scan drive motor is stopped (reference "S57" in FIG. 5), whereby the carriage member 52 is held at the removal position thereof. The standing still of the carriage member 52 at the removal position may be determined by detecting a part of the carriage member 52 with, for example, a photo-interrupter type detector (not shown). Thus, the routine of FIGS. 7 and 8 is ended.

According to the present invention, the image reader or scanning mechanism 50 can be compactly arranged because the linear light emitting surface of the light source 42 and the linear light receiving surface of the line sensor 44 are oriented in the same direction, and because the optical system 43, opposed thereto, is arranged such that the light beams emitted from the light source 42 are directed to the line sensor 44. If an image reader or scanning mechanism (50) is constituted by a light source (42), an image-forming lens (43a), and a line sensor (44), aligned with each other such that an electro-developing recording medium (30) is intervened between the light source (42) and the image-forming lens (43a), the arrangement of such an image reader (50) becomes bulkier, resulting in a bulkiness of the whole structure of the camera.

Note that the electro-developing recording medium 30 is not restricted to the structure described above, and may be any other structure by which an image is electronically developed.

In the embodiment as mentioned above, although the image reader or scanning mechanism 50 is moved with respect to the electro-developing recording medium 30, the latter may be movable with respect to the former such that a developed image of the electro-developing recording medium 30 can be scanned with the light source associated with the line sensor.

The present invention is not restricted to a single-lens reflex camera described above, but it may be applied to a lens shutter camera.

Note that, when the present invention is applied to a lens shutter camera, the shutter 22 need not be provided, as in the above described embodiment.

A single lens, a micro-lens array, a rod lens array and so on, may be used for the scanner optical system 43.

The line sensor 44 may be disposed in such a manner that light beams reflected by the electro-developing recording medium 30 are read or sensed.

Finally, it will be understood by those skilled in the art that the foregoing description is of a preferred embodiment of the disclosed electronic still video camera, and that various changes and modifications may be made to the present invention without departing from the spirit and scope thereof.

The present disclosure relates to subject matter contained in Japanese Patent Application No. 7-30128 (filed on Jan. 26, 1995), which is expressly incorporated herein, by reference, in its entirety.

I claim:

1. An electronic still video camera having an electro-developing recording medium, comprising:
  a photographing optical system that forms an optical image on an image-forming plane of said electro-developing recording medium to record and develop the optical image therein; and
  an image-sensing device that optically senses said electro-developing recording medium to obtain image data from the recorded image of said electro-developing recording medium;
  said image-sensing device comprising a light source having a light emitting surface arranged parallel with the image-forming plane of said electro-developing recording medium;
  said image sensing device further comprising an image sensor having a light receiving surface and an immovably positioned optical system, said light receiving surface of said image sensor and said light emitting surface of said light source being oriented in the same direction;
  said light source and said image sensor being associated with each other so as to be moved as a unit with respect to said electro-developing recording medium, such that light beams emitted from said light emitting surface of said light source in association with movement of said light source and said image sensor are perpendicularly directed to the image forming plane of said electro-developing recording medium and pass through the image-forming plane of said electro-developing recording medium before being directed to and focused on said light receiving surface of said image sensor, by said immovably positioned optical system.

2. An electronic still video camera as set forth in claim 1, wherein said image sensor is arranged such that the light receiving surface thereof is included in an extension of the image-forming plane of said electro-developing recording medium.

3. An electronic still video camera as set forth in claim 1, wherein the image sensor of said image-sensing device comprises a line sensor, and said light source of said image-sensing device comprises a linear light source;
  wherein said line sensor and said linear light source are associated with each other such that they are relatively movable with respect to said electro-developing recording medium, whereby the image-forming plane of said electro-developing medium is scanned with the light beams emitted from said linear light source.

4. An electronic still video camera as set forth in claim 3, wherein said line sensor and said linear light source are supported by a carriage member which is movable with respect to said electro-developing recording medium, and the optical system of said image-sensing device is immovably provided with respect to said carriage member.

5. An electronic still video camera as set forth in claim 4, wherein said optical system includes an image-forming lens and a pair of reflectors associated therewith, wherein the light beams emitted from said linear light source and passing through said electro-developing recording medium are directed to one of said reflectors and then reflected to said image-forming lens, and the light beams passing through said image-forming lens are directed to the other reflector and then reflected to the light receiving surface of said line sensor.

6. An electronic still video camera as set forth in claim 1, wherein said electro-developing recording medium comprises an electrostatic information recording medium and an electric charge keeping medium.

7. An electronic still video camera as set forth in claim 6, wherein said electrostatic information recording medium includes a photoconducting layer and an inorganic oxide material layer, and said electric charge keeping medium includes a liquid crystal display.

8. An electronic still video camera as set forth in claim 7, wherein said liquid crystal display comprises a memory type liquid crystal display.

9. The electronic still video camera according to claim 1, said optical system comprising at least one immovably positioned reflecting surface.

10. An image reader used in an electronic still video camera having an electro-developing recording medium, comprising:
  an image-sensing device that optically senses said electro-developing recording medium to obtain image data from a recorded image of said electro-developing recording medium;
  said image-sensing device comprising a light source having a light emitting surface arranged parallel with an image-forming plane of said electro-developing recording medium;

said image sensing device further comprising an image sensor having a light receiving surface and an immovably positioned optical system, said light receiving surface and said light emitting surface of said light source being oriented in the same direction;

said light source and said image sensor being associated with each other so as to be moved as a unit with respect to said electro-developing recording medium, such that light beams emitted from said light emitting surface of said light source in association with movement of said light source and said image sensor are perpendicularly directed to the image forming plane of said electro-developing recording medium and pass through the image-forming plane of said electro-developing recording medium before being directed to and focused on said light receiving surface of said image sensor, by said immovably positioned optical system.

11. An image reader as set forth in claim 10, wherein said image sensor is arranged such that said light receiving surface is included in an extension of the image-forming plane of said electro-developing recording medium.

12. An image reader as set forth in claim 10, wherein said image sensor comprises a line sensor, and said light source comprises a linear light source, said line sensor and said linear light source being associated with each other such that they are relatively movable with respect to said electro-developing recording medium, whereby the image-forming plane of said electro-developing recording medium is scanned with the light beams emitted from said linear light source.

13. An image reader as set forth in claim 12, wherein said line sensor and said linear light source are supported by a carriage member which is movable with respect to said electro-developing recording medium, and wherein the optical system of said image-sensing means is immovably provided with respect to said carriage member.

14. An image reader as set forth in claim 13, wherein said optical system includes an image-forming lens, and a pair of reflectors associated therewith, and wherein the light beams emitted from said linear light source and passing through said electro-developing recording medium are directed to one of said reflectors and then reflected to said image-forming lens, and the light beams passing through said image-forming lens are directed to the other reflector and then reflected to said light receiving surface of said line sensor.

15. An image reader as set forth in claim 10, wherein said electro-developing recording medium comprises an electrostatic information recording medium and an electric charge keeping medium.

16. An image reader as set forth in claim 15, wherein said electrostatic information recording medium includes a photoconducting layer and an inorganic oxide material layer, and said electric charge keeping medium includes a liquid crystal display.

17. An image reader as set forth in claim 16, wherein said liquid crystal display comprises a memory type liquid crystal display.

18. The image reader according to claim 10, said optical system comprising at least one immovably positioned reflecting surface.

19. An image reader for electronically reading an image recorded and developed on an image-forming plane of an electro-developing recording medium, comprising:

a light source disposed at one side of the image-forming plane of said electro-developing recording medium for illuminating the image-forming plane of said electro-developing recording medium;

an image-sensing device disposed at said one side of the image-forming plane of said electro-developing recording medium for optically sensing the image-forming plane to obtain image data from the image recorded and developed on the image-forming plane; and an image-forming optical system immovably positioned at another side of the image-forming plane of said electro-developing recording medium and including a converging lens defining two focal planes, and two reflectors associated with said converging lens, said converging lens and said two reflectors being arranged such that the focal planes defined by said converging lens are consistent with a light emitting surface of said light source and a light receiving surface of said image-sensing device;

said light source and said image sensor being associated with each other so as to be moved as a unit with respect to said electro-developing recording medium, such that light beams emitted from said light emitting surface of said light source in association with movement of said light source and said image sensor are perpendicularly directed to the image forming plane of said electro-developing recording medium and pass through the image-forming plane of said electro-developing recording medium before being directed to and focused on said light receiving surface of said image sensor, by said immovably positioned optical system.

20. An image reader as set forth in claim 19, wherein said two reflectors are arranged at sides of said converging lens such that light beams emitting from said light emitting surface of said light source device and passing through said image-forming plane of said electro-developing recording medium are reflected and directed to said converging lens along an optical axis thereof; wherein the light beams passing through said converging lens are reflected and directed to the light receiving surface of image-sensing device.

21. An image reader as set forth in claim 20, wherein said electro-developing recording medium comprises an electrostatic information recording medium and an electric charge keeping medium.

22. An image reader as set forth in claim 21, wherein said electrostatic information recording medium includes a photoconducting layer and an inorganic oxide material layer, and said electric charge keeping medium includes a liquid crystal display.

23. An image reader as set forth in claim 22, wherein said liquid crystal display comprises a memory type liquid crystal display.

* * * * *

UNITED STATES PATENT AND TRADEMARK OFFICE
CERTIFICATE OF CORRECTION

PATENT NO. : 5,842,049
DATED : November 24, 1998
INVENTOR(S) : Harumi AOKI.

It is certified that error appears in the above-identified patent and that said Letters Patent is hereby corrected as shown below:

At column 16, line 46 (claim 20, line 9) of the printed patent, "the" should be ---said---.

At column 16, line 46 (claim 20, line 9) of the printed patent, before "image-sensing" insert ---said---.

Signed and Sealed this

Fifteenth Day of February, 2000

Attest:

Q. TODD DICKINSON

*Attesting Officer*      *Commissioner of Patents and Trademarks*